(12) United States Patent
Lee et al.

(10) Patent No.: US 10,634,823 B2
(45) Date of Patent: Apr. 28, 2020

(54) LENS FOR EXTENDED LIGHT SOURCE AND DESIGN METHODS THEREOF

(71) Applicant: Marvel Digital Limited, Wanchai (HK)

(72) Inventors: Ying Chiu Herbert Lee, Wanchai (HK); Ho Sang Lam, Shatin (HK)

(73) Assignee: MARVEL DIGITAL LIMITED, Wanchai (HK)

( * ) Notice: Subject to any disclaimer, the term of this patent is extended or adjusted under 35 U.S.C. 154(b) by 397 days.

(21) Appl. No.: 15/617,720

(22) Filed: Jun. 8, 2017

(65) Prior Publication Data
US 2017/0357034 A1 Dec. 14, 2017

(30) Foreign Application Priority Data
Jun. 10, 2016 (HK) .................. 16106705.5

(51) Int. Cl.
*G02B 3/00* (2006.01)
*G02B 3/04* (2006.01)
*F21V 5/00* (2018.01)
*G02B 19/00* (2006.01)
*G06F 30/00* (2020.01)
(Continued)

(52) U.S. Cl.
CPC .................. *G02B 3/04* (2013.01); *F21V 5/00* (2013.01); *F21V 5/04* (2013.01); *G02B 13/16* (2013.01); *G02B 13/18* (2013.01); *G02B 19/0014* (2013.01); *G02B 19/0047* (2013.01); *G06F 30/00* (2020.01); *F21Y 2105/10* (2016.08);
(Continued)

(58) Field of Classification Search
CPC .... G02B 2003/0093; G02B 3/02; G02B 3/04; G02B 3/08; G02B 9/02; G02B 13/18; F21V 5/04

USPC ....... 359/642, 708–712, 718, 719, 724, 741, 359/742
See application file for complete search history.

(56) References Cited

U.S. PATENT DOCUMENTS 3,740,119 A * 6/1973 Sakurai ................... G02B 3/08
359/628
2013/0058104 A1 3/2013 Catalano

FOREIGN PATENT DOCUMENTS

CN 101907263 A 12/2010
CN 104390194 A 3/2015
(Continued)

OTHER PUBLICATIONS

Sep. 4, 2017 International Search Report Concerning PCT International Application No. PCT/CN2017/087396.
(Continued)

*Primary Examiner* — Darryl J Collins
(74) *Attorney, Agent, or Firm* — Duane Morris LLP

(57) ABSTRACT

The present invention relates to the technical area of lens, particularly discloses a lens for focusing or collimating light emitted from an extended light source, which comprises a front surface facing towards the extended light source and a back surface facing away from the extended light source, wherein at least one of the surfaces comprises a central section and a plurality of annular sections concentrically surrounding the central section; and wherein each of the annular section corresponds to a small portion of the extended light source. A method of designing the above lens is also disclosed. Additionally, the present invention provides a cost-effective lens design with high precision and more particularly, a lens design which meets the transmittance requirement for extended light source.

13 Claims, 6 Drawing Sheets

(51) Int. Cl.
  *F21V 5/04*   (2006.01)
  *G02B 13/16*  (2006.01)
  *G02B 13/18*  (2006.01)
  *F21Y 105/10*  (2016.01)
  *G06F 111/10*  (2020.01)
  *G02B 27/00*  (2006.01)

(52) U.S. Cl.
  CPC ...... *G02B 27/0012* (2013.01); *G06F 2111/10* (2020.01)

(56) References Cited

FOREIGN PATENT DOCUMENTS

| | | |
|---|---|---|
| CN | 104696889 A | 6/2015 |
| CN | 104849846 A | 8/2015 |
| CN | 105261613 A | 1/2016 |
| CN | 106090674 A | 11/2016 |
| HK | 1217870 A2 | 1/2017 |
| WO | WO 2017211286 A1 | 12/2017 |

OTHER PUBLICATIONS

Sep. 4, 2017 Written Opinion Concerning PCT International Application No. PCT/CN2017/087396.
Aug. 7, 2018 First Office Action issued by China's National Intellectual Property Administration re Chinese Pat. Appl'n. No. 201710427469.7 (English translation herein attached).
Jul. 19, 2018 Search Report issued by China's National Intellectual Property Administration re Chinese Patent Application No. 2017104274697.7.

\* cited by examiner

LENS FOR EXTENDED LIGHT SOURCE AND DESIGN METHODS THEREOF

CROSS-REFERENCE TO PRIOR APPLICATION(S)

This utility application claims priority in and to Hong Kong Short-Term Patent Application No. 16106705.5, filed Jun. 10, 2016, now Hong Kong Short-Term Patent No. 1217870, issued Jan. 20, 2017, which is incorporated herein by reference.

TECHNICAL FIELD

The present invention relates to a lens, in particular a lens with annular segments that is designed to focus or collimate light from extended light source, such as line or surface light source.

BACKGROUND

Light source from an infinite distance is often referred as a point source 13 with negligible dimension, of which the light is diffused evenly in all directions representing by the broken lines 11 in FIG. 1. No light source is indeed infinitely small in reality. For example, the light emitting diodes and the pixels on image sensor do have actual dimension and therefore can be treated as an extended light source, such as a tiny line or surface light source. Nevertheless, assuming that the light source is a point light source can make certain optical analysis simpler. Therefore, derivations of equations for object and image distances, focal length and magnification have all been based on the assumption that the light source is theoretically a point light source.

Light diffused from an extended light source is represented by the solid lines 12 in FIG. 1. Differing from an isotropic point light source, light diffused from the center of an extended light source 14 spreads out less and therefore is with higher light intensity while the light from the side of the extended light source spreads out more and is with lower light intensity. Therefore, optical lens design based upon the aforementioned assumption of point light source and ignoring the features of an extended light source would result in undesirous effects, regardless of the materials used. For example, when such optical lens design is used for general lighting purposes, it results in different brightness between the central portion and the peripheral of a light and in turn affects the illuminating effect. Similarly, when such optical lens design is used in imaging, the lens fails to focus or collimate perfectly resulting in aberration, which is a fundamental problem of optical lens design causing unclear image. If the extended light source is relatively large, not simply aberration, there may also be distortion of image. Therefore, ordinary lens design such as spherical lens is not suitable for applying to point light source, in particular for larger line or surface light source. FIG. 2 compared the difference between the refracted light 21 of a point light source 23 and the refracted light 22 of an extended light source 24 through a plano-convex lens 25.

To minimize the aforesaid undesirous effect, aspherical lens is widely used in the industry. FIG. 3 shows the difference between the shape of a spherical lens 31 and the shape of an aspherical lens 32. The curvature of aspheric lenses surface can specifically grinded or molded to accommodate the size and dimension of a light source. Due to the uniqueness of the aspherical structure, convention tools do not have the aspheric processing ability, and they need special processing methods such as ultra-precision bonnet polishing method. Procurement and utilizing such sophisticated equipment results in high production costs and such high production costs would ultimately be shifted to the customers. Therefore, aspherical lens always maintains at a very high market price. Furthermore, not only the design is very complex and with high production costs, but also the plane precision of aspherical lens is also lower than the convention lens. Accordingly, a costs effective lens design with high precision, more particularly a lens design which meets the transmittance requirement for extended light source, is of the primary objective of the present invention.

BRIEF SUMMARY

The primary objective of the present invention is to provide a lens for focusing or collimating light from an extended light source, such as a line or surface light source.

To achieve the objective mentioned above, in accordance with one aspect disclosed herein, a lens for focusing or collimating light emitted from an extended light source, comprising a front surface facing towards said extended light source and a back surface facing away from said extended light source, wherein at least one of the surfaces comprises a central section and a plurality of annular sections concentrically surrounding the central section, and wherein each of the annular sections corresponds to a small portion of the extended light source.

In an exemplary embodiment, said lens includes said front surface is a flat surface, and said back surface is a convex polygonal surface comprising the central section and said plurality of annular sections concentrically surrounding the central section.

In an exemplary embodiment, said lens includes sectional view of the annular sections are line segments, and said line segments can be expressed as:

$$y = k_n x + k_{n-1} a_{n-1} + k_{n-2} a_{n-2} + \ldots + k_2 a_2 + k_1 a_1 + h \quad (1)$$

wherein k is the slope of each of the said annular sections;
  a is the projected width of each of the said annular sections on the x-axis;
  h is the thickness of the edge of said annular section at the outermost; and
  n represents the number of said annular section.

In an exemplary embodiment, said lens includes said annular section at the outermost refracts light rays from the outermost portion of the extended light source at an angle $\theta_{11}$ expressed in the following equation (2):

$$\frac{\dfrac{D-L}{2} - \dfrac{h \cdot \sin\theta'_{11}}{\sin(90° - \theta'_{11})}}{\sin\theta'_{21}} = \frac{H}{\sin(90° - \theta'_{21})} \quad (2)$$

wherein $$n_1 \sin \theta'_{21} = n_2 \sin \theta'_{11} \quad (3)$$

$$n_1 \sin \theta_{11} = n_2 \sin \theta_{21} \quad (4)$$

wherein $n_1$ is the refractive index of air;
  $n_2$ is the refractive index of the material of said lens;
  $\theta_{11}$ is the angle of refraction when the light from the outermost portion of said extended light source leaves said lens through said annular section at the outermost;
  $\theta'_{11}$ is the angle of refraction when the light from the outermost portion of
  said extended light source has entered said lens;

$\theta_{21}$ is the angle of incidence when the light from the outermost portion of said extended light source is going to leave said lens through said annular section at the outermost;

$\theta'_{21}$ is the angle of incidence when the light from the outermost portion of said extended light source enters said lens;

h is the thickness of the edge of said annular section at the outermost;

L is the diameter of said extended light source;

D is the diameter of said lens; and

H is the distance between said lens and said extended light source.

In an exemplary embodiment, said lens includes said annular section at the outermost is configured with width expressed in the following equation (5):

$$\frac{m_1}{\sin\beta} = \frac{\sqrt{\left(G + \frac{L}{n} + c\right)^2 + h^2}}{\sin(90° + \theta'_{21} - \theta'_{11} - \theta_{21})} \quad (5)$$

wherein $$\beta = 90° - \theta'_{21} - \tan^{-1}\frac{h}{G + \frac{L}{n} + c} \quad (6)$$

$$c = \frac{h \cdot \sin\theta'_{11}}{\sin(90° - \theta'_{11})} \quad (7)$$

$$B = \frac{H}{\sin(90° - \theta'_{21})} \quad (8)$$

$$G = \frac{B \cdot \sin(\theta'_{21} - \theta'_{22})}{\sin(90° + \theta'_{22})} \quad (9)$$

wherein B, G and c are assisted lengths and $\beta$ is an assisted angle for calculation as shown in FIG. 6;

$m_1$ is the width of said annular section at the outermost;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta'_{21}$ is the angle of incidence when the light from the outermost portion of said extended light source enters said lens;

$\theta'_{22}$ is the angle of incidence when the light from the second outermost portion of said extended light source enters said lens;

$$\frac{L}{n}$$

is the size of each portion of said extended light source assuming that said extended light source is divided into n portions;

h is the thickness of the edge of said annular section at the outermost; and

H is the distance between said lens and said extended light source.

In an exemplary embodiment, said lens includes each of the annular sections are different widths so as to tailor to different applications of said lens.

In an exemplary embodiment, said lens is made of materials for optical or imaging purposes. Said materials includes optical grade polymers, glasses or a combination thereof.

In an exemplary embodiment, said lens is a lens used in optical devices, which includes film cameras, digital cameras, mobile phones and tablets. In an exemplary embodiment, said lens is a lenticular used in optical devices, which includes 3D displays, televisions and image projectors. In an exemplary embodiment, said lens is a lens used in lighting devices.

In another aspect disclosed herein, a method for designing a lens for focusing or collimating light emitted from an extended light source, comprising the steps of: (a) measuring the dimension of an extended light source; (b) deciding the number of annular sections of a lens surface which corresponds to said extended light source; (c) calculating the width of each of the said annular sections; (d) calculating the flat surface area of said annular sections; and (e) forming a lens surface by connecting a central section with said annular sections, wherein said annular sections concentrically surrounding said central section.

In an exemplary embodiment, said method wherein said calculating the width of each of the said annular sections further comprises:

(i) said calculating angle of refraction when light from said extended light source passing through the annular sections; and (ii) calculating the width of each of the said annular sections based on said angle of refraction obtained.

In an exemplary embodiment, said method wherein said calculating angle of refraction when light from said extended light source passing through said annular sections is expressed in following equation (2), wherein said light from said extended light source is represented by light from the outermost portion of said extended light source and said annular sections is represented by annular section at the outermost:

$$\frac{\frac{D-L}{2} - \frac{h \cdot \sin\theta'_{11}}{\sin(90° - \theta'_{11})}}{\sin\theta'_{21}} = \frac{H}{\sin(90° - \theta'_{21})} \quad (2)$$

wherein $$n_1 \cdot \sin\theta'_{21} = n_2 \cdot \sin\theta'_{11} \quad (3)$$

$$n_1 \cdot \sin\theta_{11} = n_2 \cdot \sin\theta_{21} \quad (4)$$

wherein $n_1$ is the refractive index of air;

$n_2$ is the refractive index of the material of said lens;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta_{21}$ is the angle of incidence when the light from the outermost portion of said extended light source is going to leave said lens through said annular section at the outermost;

$\theta'_{21}$ is the angle of incidence when the light from the outermost portion of said extended light source enters said lens;

h is the thickness of the edge of said annular section at the outermost;

L is the diameter of said extended light source;

D is the diameter of said lens; and

H is the distance between said lens and said extended light source.

In an exemplary embodiment, said method wherein said calculating the width of each of the said annular sections based on said angle of refraction obtained is expressed in the following equation (5) wherein said width of each of the said annular sections is represented by width of annular sections at the outermost:

$$\frac{m_1}{\sin\beta} = \frac{\sqrt{\left(G + \frac{L}{n} + c\right)^2 + h^2}}{\sin(90° + \theta'_{21} - \theta'_{11} - \theta_{21})} \quad (5)$$

wherein $$\beta = 90° - \theta'_{21} - \tan^{-1}\frac{h}{G + \frac{L}{n} + c} \quad (6)$$

$$c = \frac{h \cdot \sin\theta'_{11}}{\sin(90° - \theta'_{11})} \quad (7)$$

$$B = \frac{H}{\sin(90° - \theta'_{21})} \quad (8)$$

$$G = \frac{B \cdot \sin(\theta'_{21} - \theta'_{22})}{\sin(90° + \theta'_{22})} \quad (9)$$

wherein B, G and c are assisted lengths and β is an assisted angle for calculation as shown in FIG. 6;

$m_1$ is the width of said annular section at the outermost;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta'_{21}$ is the angle of incidence when the light from the outermost portion of said extended light source enters said lens;

$\theta'_{22}$ is the angle of incidence when the light from the second outermost portion of said extended light source enters said lens;

$\frac{L}{n}$ is the size of each portion of said extended light source assuming that said extended light source is divided into n portions;

h is the thickness of the edge of said annular section at the outermost; and

H is the distance between said lens and said extended light source.

Lens can generally be divided into flat lens, convex, concave, aspherical, as well as free-form surface lens. In the free-form surface lens, it can be further divided into continuous surface lens and non-continuous surface lens. In an embodiment, the conventional curved surface of a convex lens is replaced by a central section concentrically surrounding by multiple annular sections and therefore belongs to the free-form non-continuous surface lens. When light from an extended light source, such as a line or surface light source, passes through this new lens structure, each annular section will correspond to a small portion of the extended light source. Hence, a method specifically for handling extended light source lighting and imaging is achieved.

The present invention maintains the characteristics of the conventional curved lens, but with small rings structure (i.e., the said plurality of annular sections) which can correspond to each small portion of the extended light source. The present invention is with a simple structure (i.e., there is a convex polygonal surface comprising a central section and a plurality of annular sections concentrically surrounding said central section). Refinement of such simple structure can be done by conventional machine tools, which can significantly reduce the production costs but at the same time achieving the aforementioned purpose of handling extended light source lighting and imaging.

BRIEF DESCRIPTION OF THE FIGURES

The accompanying figures, which are incorporated herein and form a part of the specification, illustrates the embodiments of the present disclosure and, together with the description, further serve to explain the principles of the embodiments and to enable a person skilled in the pertinent art to make and use the embodiments. The figures are for illustration purposes and are not necessarily drawn to scale.

DETAILED DESCRIPTION

In the following description, numerous specific details are set forth in order to provide a thorough understanding of the embodiments of the present disclosure. However, it will be apparent to those skilled in the art that the embodiments, including structures, systems and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The present invention provides a lens design for focusing or collimating light from an extended light source, such as a line or surface light source. An extended light source, differing from a point light source, diffuses light in an uneven manner. The light from the center of the extended light source spreads out less and is with higher light intensity while the light from the side of the extended light source spreads out more and is with lower light intensity. Without a lens having a property to adjust the refraction angle of light and to correspond to each portion of the extended light source, uneven brightness, aberration or distortion of image would result. Therefore, instead of having single continuous curved surface, at least one surface of the present invention comprises of a central section surrounding by a plurality of annular sections. When light from an extended light source passes through the present invention, each annular section corresponds to a small portion of the extended light source. The width and connecting angle of each of the annular section can be adjusted so that the light diffused from an extended light source can be focused on the focal plane without aberration or collimated in parallel light rays.

The present invention comprises two surfaces. A front surface faces towards the extended light source while a back surface faces away from the extended light source. At least one of the surfaces comprises a central section and a plurality of annular sections concentrically surrounding the central section. Such central section and plurality of annular sections concentrically surrounding the central section forms a polygonal surface. Preferably, such polygonal surface is a convex surface, though a concave surface is also suitable. Preferably, the back surface of the lens is provided with the plurality of annular sections, though the front surface is also suitable.

Figure 1:
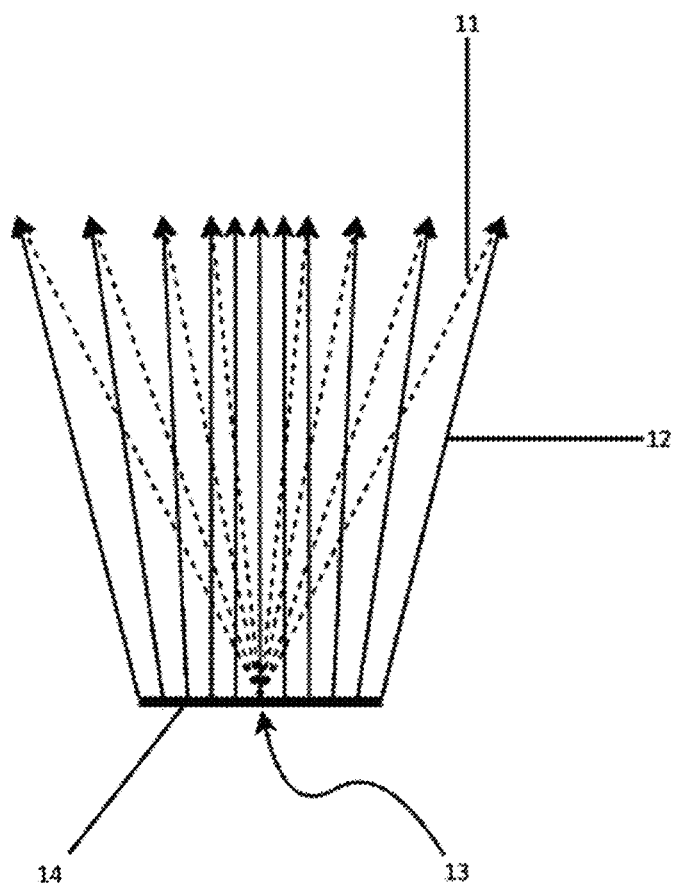
FIG. 1 is a ray diagram comparing the diffusion of light between a point light source and an extended light source.
Figure 2:
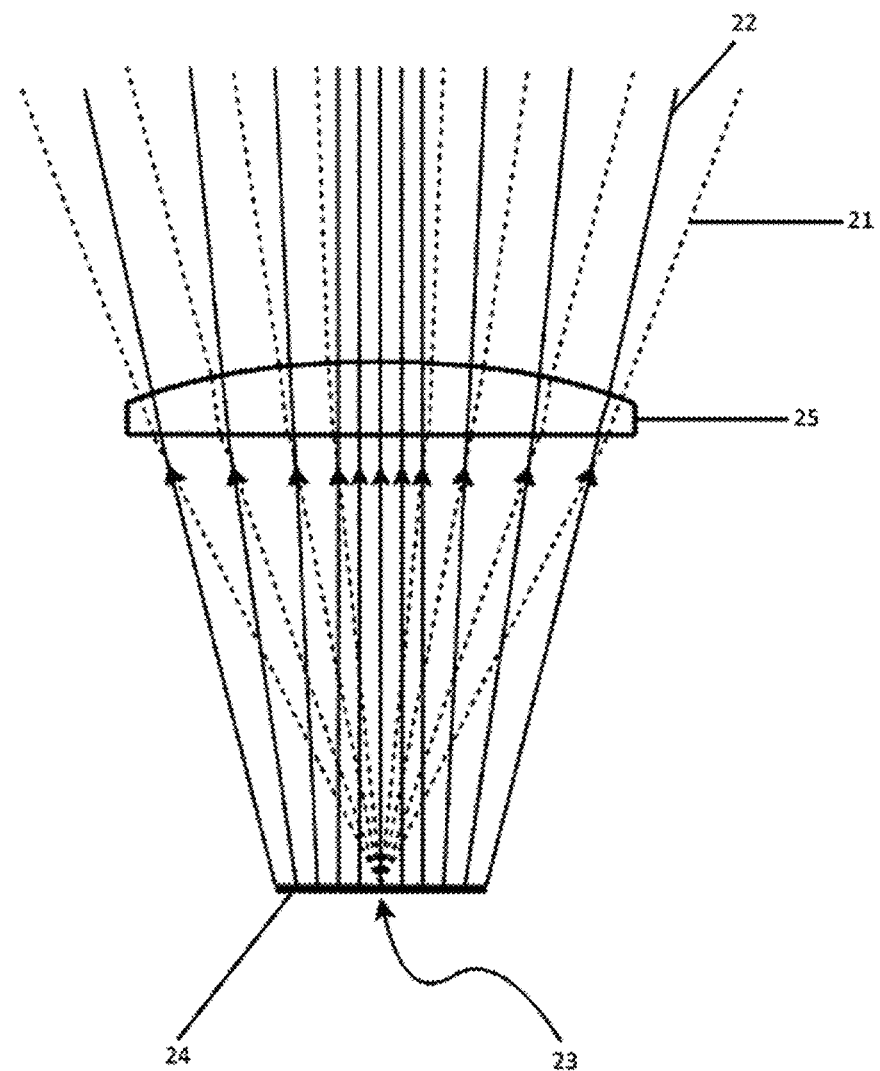
FIG. 2 is a ray diagram showing the refraction of light from a point light source and an extended light source respectively.
Figure 3:
FIG. 3 shows cross sectional views of an aspherical lens and a spherical lens respectively.
Figure 4:
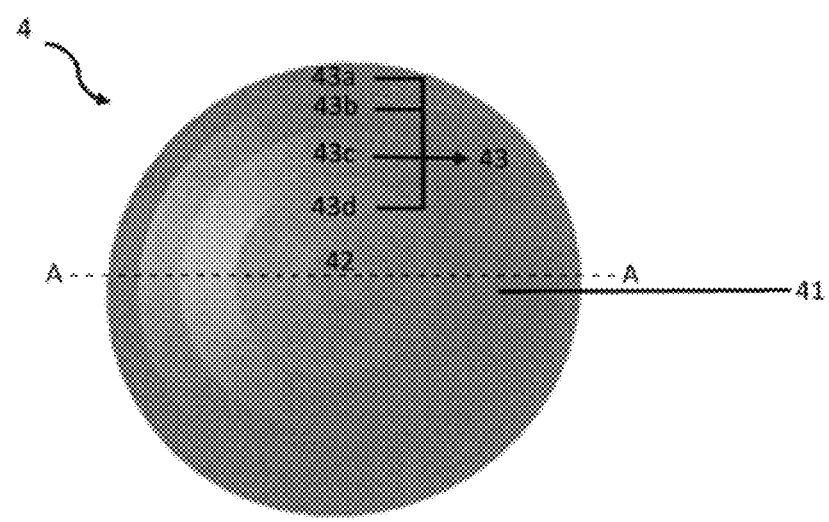
FIG. 4 is a three-dimensional view of the central section and a plurality of annular sections of the present invention.

FIG. 4 shows one embodiment of the present invention. In this embodiment, the present invention lens 4 comprises a flat front surface facing towards an extended light source (which is not shown in this figure), and a convex polygonal back surface 41. The convex polygonal back surface 41 comprises of a central section 42 and annular sections 43 concentrically surrounding the central section. As shown, there are four annular sections 43a, 43b, 43c and 43d. Number and width of annular sections 43 depends on the dimension of the extended light source. It is understood that alteration of the number and width of annular sections 43 is possible without departing from the scope of the disclosure.

Figure 5:
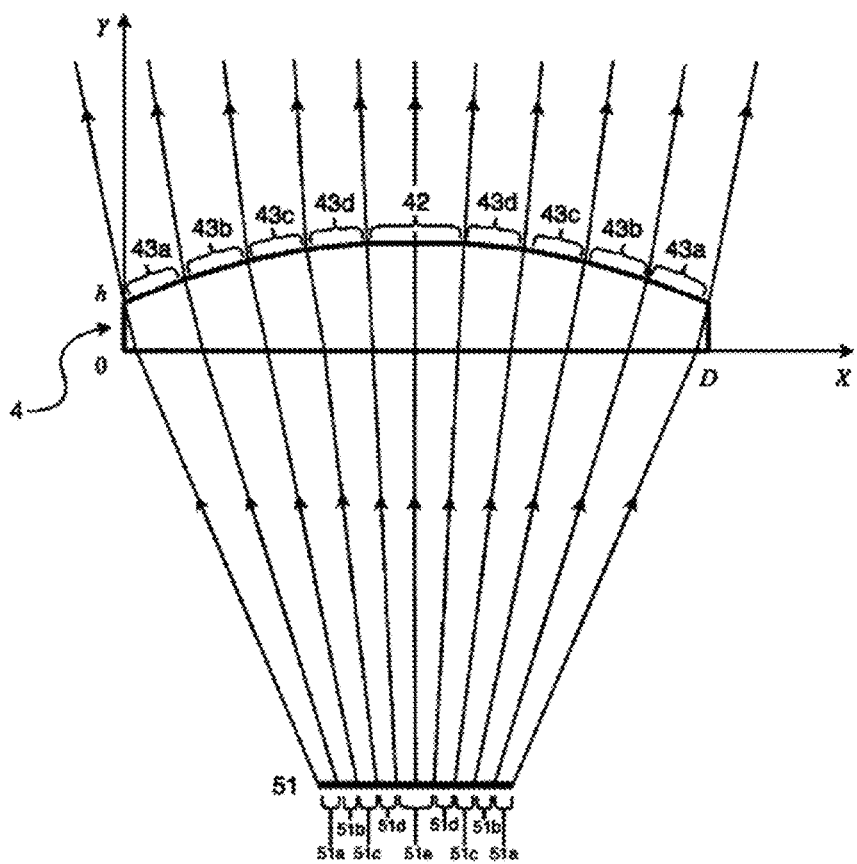
FIG. 5 is a sectional view taken along the line A-A in FIG. 4 which shows the geometry of collimated light rays passing through the present invention.
Figure 6:
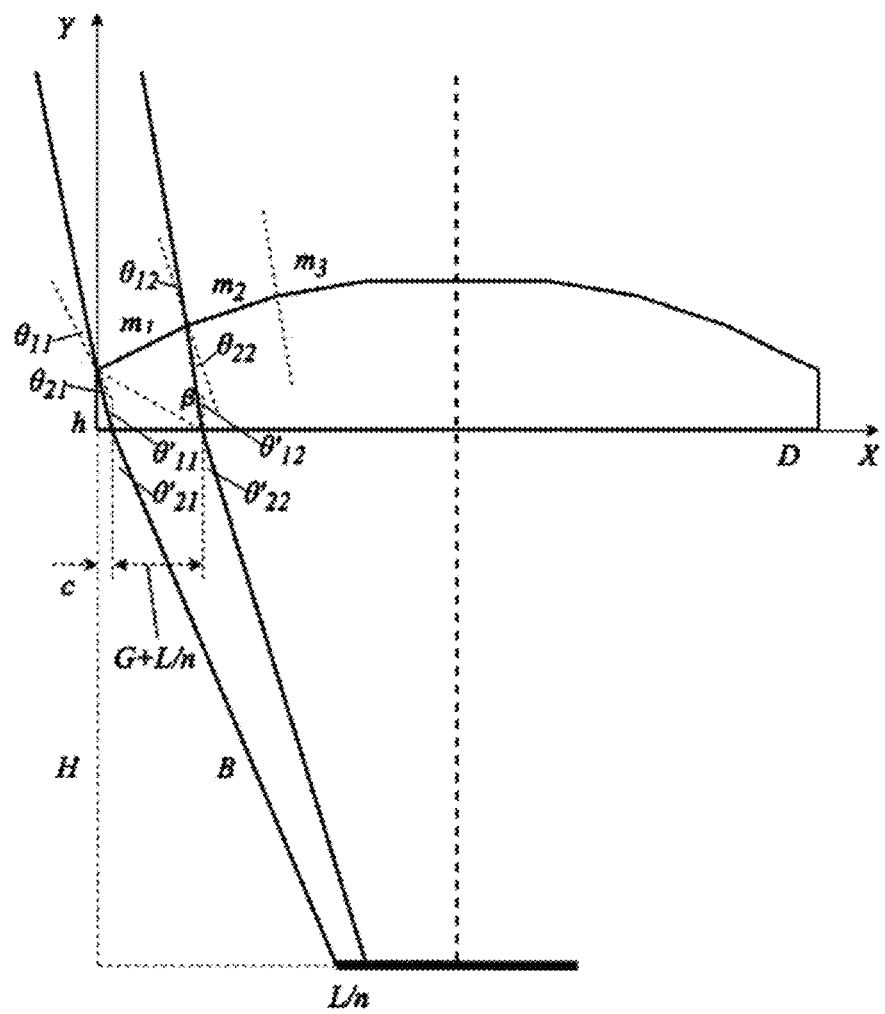
FIG. 6 is an explanatory view showing relationship among the angles of incidence and angles of refraction of the light rays passing through the present invention and the width of the annular sections.

FIG. 5 shows the sectional view of the present invention lens 4 taken along the line A-A in FIG. 4. Assuming the emittance of the extended light source 51 at the bottom is evenly distributed into a number of small portions, and each small portion corresponds to a section of the lens 4. The central section 42 corresponds to the central portion 51e of the extended light source 51 and allows the light emitted from the central portion 51e of the extended light source 51 to pass through. Each annular section 43 corresponds to a small portion of the extended light source 51. For example, annular sections 43a, 43b, 43c and 43d correspond to portions 51a, 51b, 51c and 51d of the extended light source respectively. In order to ensure the light diffused from the extended light source 51 focuses on the focal plane or collimates as parallel light rays, the width and flat surface area of each of the annular sections 43 and the angle of each of the annular sections 43 connected to the adjacent central section 42 or annular section 43 are calculated in a manner correspond to the angle of incidence of the light from the extended light source 61. As shown in FIG. 5, sectional view of the annular sections 43 are line segments which can be expressed as $$y = k_n x + k_{n-1} a_{n-1} + k_{n-2} a_{n-2} + \ldots + k_2 a_2 + k_1 a_1 + h \quad (1)$$

wherein k is the slope of each annular section;
a is the projected width of each annular section on the x-axis;

h is the thickness of the edge of the annular section at the outermost; and n represents the number of the annular section As shown in FIG. 6, the design of the present invention applies fundamental principle of refraction. The angle of incidence and the angle of refraction of light emitted from each portion of the extended light source as well as the width and flat surface area of each annular section can therefore be determined. For example, the equations below show the calculation of width $m_1$ of the annular section at the outermost.

First, the annular section at the outermost refracts light emitted from the outermost portion of the extended light source at an angle $\theta_{11}$ which can be obtained in the following equation:

$$\frac{\frac{D-L}{2} - \frac{h \cdot \sin\theta'_{11}}{\sin(90° - \theta'_{11})}}{\sin\theta'_{21}} = \frac{H}{\sin(90° - \theta'_{21})} \quad (2)$$

wherein $$n_1 \cdot \sin\theta'_{21} = n_2 \cdot \sin\theta'_{11} \quad (3)$$

$$n_1 \cdot \sin\theta_{11} = n_2 \cdot \sin\theta_{21} \quad (4)$$

wherein $n_1$ is the refractive index of air;
$n_2$ is the refractive index of the material of said lens;
$\theta_{11}$ is the angle of refraction when the light from the outermost portion of said extended light source leaves said lens through said annular section at the outermost;
$\theta'_{11}$ is the angle of refraction when the light from the outermost portion of said extended light source has entered said lens;
$\theta_{21}$ is the angle of incidence when the light from the outermost portion of said extended light source is going to leave said lens through said annular section at the outermost;
$\theta'_{21}$ is the angle of incidence when the light from the outermost portion of said extended light source enters said lens;
h is the thickness of the edge of said annular section at the outermost; L is the diameter of said extended light source;
D is the diameter of said lens; and
H is the distance between said lens and said extended light source.

The width $m_1$ of the annular section at the outermost can then be determined through the following equations:

$$\frac{m_1}{\sin\beta} = \frac{\sqrt{\left(G + \frac{L}{n} + c\right)^2 + h^2}}{\sin(90° + \theta'_{21} - \theta'_{11} - \theta_{21})} \quad (5)$$

where $$\beta = 90° - \theta'_{21} - \tan^{-1}\frac{h}{G + \frac{L}{n} + c} \quad (6)$$

$$c = \frac{h \cdot \sin\theta'_{11}}{\sin(90° - \theta'_{11})} \quad (7)$$

-continued $$B = \frac{H}{\sin(90° - \theta'_{21})} \quad (8)$$

$$G = \frac{B \cdot \sin(\theta'_{21} - \theta'_{22})}{\sin(90° + \theta'_{22})} \quad (9)$$

wherein B, G and c are assisted lengths and β is an assisted angle for calculation as shown in FIG. 6;

$m_1$ is the width of said annular section at the outermost;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta'_{21}$ is the angle of incidence when the light from the outermost portion of said extended light source enters said lens;

$\theta'_{22}$ is the angle of incidence when the light from the second outermost portion of said extended light source enters said lens;

$$\frac{L}{n}$$

is the size of each portion of said extended light source assuming that said extended light source is divided into n portions;

h is the thickness of the edge of said annular section at the outermost; and

H is the distance between said lens and said extended light source.

Since the value of D, H and L are known while the value of h and n can be set when designing the present invention, the angle of incidence and the angle of refraction of light from each portion of the extended light source as well as the width of each annular section can therefore be determined. The flat surface area of each annular section can also be calculated based on the value of the width of each annular section obtained. The width and flat surface area of each of the annular sections can be calculated and tailored to different applications of the present invention.

In practice, a satisfactory effect in correcting of uneven brightness of the refracted light and the aberration can be obtained through the aforementioned calculation.

The present invention is made of materials for optical or imaging purposes including optical grade polymers and glasses.

The present invention can be applied in any optical devices, such as lens for film cameras, digital cameras, mobile phones, tablet. Also, the lens can be a lenticular in optical devices, including image projectors, televisions (including 3D televisions) or 3D displays.

The present invention also provides a method for designing a lens for focusing or collimating light emitted from an extended light source, comprising the steps of: (a) measuring the dimension of an extended light source; (b) deciding the number of annular sections of a lens surface which corresponds to the extended light source; (c) calculating the width of each of the annular sections; (d) calculating the flat surface area of the annular sections; and (e) forming a lens surface by connecting a central section with the annular sections wherein the annular sections concentrically surrounding the central section.

The step of calculating the width of each of the annular sections further comprises (i) calculating angle of refraction when light from extended light source passing through the annular sections; and (ii) calculating the width of each of the annular sections based on the angle of refraction obtained.

The step of calculating angle of refraction when light from extended light source passing through the annular sections is expressed in following equation (2), wherein light from extended light source is represented by light from the outermost portion of the extended light source and the annular sections is represented by annular section at the outermost:

$$\frac{\frac{D-L}{2} - \frac{h \cdot \sin\theta'_{11}}{\sin(90° - \theta'_{11})}}{\sin\theta'_{21}} = \frac{H}{\sin(90° - \theta'_{21})} \quad (2)$$

wherein $$n_1 \cdot \sin \theta'_{21} = n_2 \cdot \sin \theta'_{11} \quad (3)$$

$$n_1 \cdot \sin \theta_{11} = n_2 \cdot \sin \theta_{21} \quad (4)$$

wherein $n_1$ is the refractive index of air;

$n_2$ is the refractive index of the material of said lens;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta_{21}$ is the angle of incidence when the light from the outermost portion of said extended light source is going to leave said lens through said annular section at the outermost;

$\theta'_{21}$ is the angle of incidence when the light from the outermost portion of said extended light source enters said lens;

h is the thickness of the edge of said annular section at the outermost; L is the diameter of said extended light source;

D is the diameter of said lens; and

H is the distance between said lens and said extended light source.

The step of calculating the width of each of the annular sections based on the angle of refraction obtained is expressed in the following equation (5) wherein the width of each of the annular sections is represented by width of annular sections at the outermost:

$$\frac{m_1}{\sin\beta} = \frac{\sqrt{\left(G + \frac{L}{n} + c\right)^2 + h^2}}{\sin(90° + \theta'_{21} - \theta'_{11} - \theta_{21})} \quad (5)$$

wherein $$\beta = 90° - \theta'_{21} - \tan^{-1}\frac{h}{G + \frac{L}{n} + c} \quad (6)$$

$$c = \frac{h \cdot \sin\theta'_{11}}{\sin(90° - \theta'_{11})} \quad (7)$$

-continued $$B = \frac{H}{\sin(90° - \theta'_{21})} \quad (8)$$

$$G = \frac{B \cdot \sin(\theta'_{21} - \theta'_{22})}{\sin(90° + \theta'_{22})} \quad (9)$$

wherein B, G and c are assisted lengths and β is an assisted angle for calculation as shown in FIG. 6;

$m_1$ is the width of said annular section at the outermost;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta'_{21}$ is the angle of incidence when the light from the outermost portion of said extended light source enters said lens;

$\theta'_{22}$ is the angle of incidence when the light from the second outermost portion of said extended light source enters said lens;

$$\frac{L}{n}$$

is the size of each portion of said extended light source assuming that said extended light source is divided into n portions;

h is the thickness of the edge of said annular section at the outermost; and

H is the distance between said lens and said extended light source.

It will be understood that the above embodiment is shown and described by way of illustration only. Many different embodiments of the present invention are possible, such as alterations of the number of annular rings, alterations of the width of each of the annular ring and the methods in calculating the width and flat surface area, without departing from the scope of disclosure. The abovementioned embodiments illustrate the possible scope of the disclosure but do not restrict the scope of the disclosure.

What is claimed is:

1. A lens for focusing or collimating light emitted from an extended light source, comprising:
   a front surface facing towards said extended light source; and
   a back surface facing away from said extended light source;
   wherein:
   at least one of the surfaces comprises a central section and a sequence of annular sections concentrically surrounding said central section;
   each of the said annular sections corresponds to a small portion of said extended light source; and
   an annular section with an ordinal number n in said sequence of annular sections can be expressed based on:
   a slope of each of the said annular sections with ordinal numbers 1 to n−1,
   a projected width of each of the said annular sections with ordinal numbers 1 to n−1 on an x-axis, and
   a thickness of an edge of said lens.

2. The lens of claim 1, wherein said front surface is a flat surface, and said back surface is a convex polygonal surface comprising said central section and said sequence of annular sections.

3. The lens of claim 1, wherein sectional view of said annular sections are straight line segments, and said line segments can be expressed as $$y = k_n x + k_{n-1} a_{n-1} + k_{n-2} a_{n-2} + \ldots + k_2 a_2 + k_1 a_1 + h \quad (1)$$

wherein k is the slope of each of the said annular sections;

a is the projected width of each of the said annular sections on the x-axis;

h is the thickness of the edge of said annular section at the outermost; and n represents the ordinal number of said annular section.

4. The lens of claim 3, wherein said annular section at the outermost refracts light from the outermost portion of said extended light source at an angle $\theta_{11}$ expressed in the following equation (2):

$$\frac{\frac{D-L}{2} - \frac{h \cdot \sin\theta'_{11}}{\sin(90° - \theta'_{11})}}{\sin\theta'_{21}} = \frac{H}{\sin(90° - \theta'_{21})} \quad (2)$$

wherein $$n_1 \cdot \sin \theta'_{21} = n_2 \cdot \sin \theta'_{11} \quad (3)$$

$$n_1 \cdot \sin \theta_{11} = n_2 \cdot \sin \theta_{21} \quad (4)$$

wherein $n_1$ is the refractive index of air;

$n_2$ is the refractive index of the material of said lens;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta_{21}$ is the angle of incidence when the light from the outermost portion of said extended light source is going to leave said lens through said annular section at the outermost;

$\theta'_{21}$ is the angle of incidence when the light from the outermost portion of said extended light source enters said lens;

h is the thickness of the edge of said annular section at the outermost;

L is the diameter of said extended light source;

D is the diameter of said lens; and

H is the distance between said lens and said extended light source.

5. The lens of claim 4, wherein said annular section at the outermost is configured with width expressed in the following equation (5):

$$\frac{m_1}{\sin\beta} = \frac{\sqrt{\left(G + \frac{L}{n} + c\right)^2 + h^2}}{\sin(90° + \theta'_{21} - \theta'_{11} - \theta_{21})} \quad (5)$$

wherein $$\beta = 90° - \theta'_{21} - \tan^{-1}\frac{h}{G + \frac{L}{n} + c} \quad (6)$$

$$c = \frac{h \cdot \sin\theta'_{11}}{\sin(90° - \theta'_{11})} \quad (7)$$

$$B = \frac{H}{\sin(90° - \theta'_{21})} \quad (8)$$

$$G = \frac{B \cdot \sin(\theta'_{21} - \theta'_{22})}{\sin(90° + \theta'_{22})} \quad (9)$$

wherein B, G and c are the assisted length and β is an assisted angle;

$m_1$ is the width of said annular section at the outermost;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta'_{21}$ is the angle of incidence when the light from the outermost portion of said extended light source enters said lens;

$\theta'_{22}$ is the angle of incidence when the light from the second outermost portion of said extended light source enters said lens;

$$\frac{L}{n}$$

is the size of each portion of said extended light source assuming that said extended
light source is divided into n portions;

h is the thickness of the edge of said annular section at the outermost; and

H is the distance between said lens and said extended light source.

6. The lens of claim 1, wherein each of the said annular sections are with different widths so as to tailor to different applications of said lens.

7. The lens of claim 1, wherein said lens is made of materials for optical or imaging purposes, wherein said materials include optical grade polymers, glasses, or a combination thereof.

8. The lens of claim 1, wherein said lens is a lens used in an optical device, wherein said optical device includes a film camera, a digital camera, a mobile phone or a tablet.

9. The lens of claim 1, wherein said lens is a lenticular used in an optical device, wherein said optical device includes a 3D display, a television or an image projector.

10. The lens of claim 1, wherein said lens is a lens used in lighting devices.

11. A method of designing a lens for focusing or collimating light emitted from an extended light source, comprising the steps of:

(a) measuring the dimension of an extended light source;

(b) deciding the number of annular sections of a lens surface which corresponds to said extended light source;

(c) calculating the width of each of the said annular sections based on an angle of refraction when light from said extended light source passing through the annular sections, wherein said calculating the width of each of the said annular sections further comprises calculating said angle of refraction based on:

a refractive index of air, a refractive index of a material of said lens, an angle of refraction when the light from an outermost portion of said extended light source leaves said lens through said annular section at the outermost, an angle of refraction when the light from the outermost portion of said extended light source has entered said lens, an angle of incidence when the light from the outermost portion of said extended light source is going to leave said lens through said annular section at the outermost, an angle of incidence when the light from the outermost portion of said extended light source enters said lens, a thickness of an edge of said annular section at the outermost, a diameter of said extended light source, a diameter of said lens, and a distance between said lens and said extended light source;

(d) calculating the flat surface area of said annular sections; and (e) forming a lens surface by connecting a central section with said annular sections, wherein said annular sections concentrically surrounding said central section.

12. The method of claim 11, wherein said calculating angle of refraction when light from said extended light source passing through said annular sections is expressed in following equation (2), wherein said light from said extended light source is represented by light from the outermost portion of said extended light source and said annular sections is represented by annular section at the outermost:

$$\frac{\frac{D-L}{2} - \frac{h \cdot \sin\theta'_{11}}{\sin(90° - \theta'_{11})}}{\sin\theta'_{21}} = \frac{H}{\sin(90° - \theta'_{21})} \quad (2)$$

wherein $$n_1 \cdot \sin\theta'_{21} = n_2 \cdot \sin\theta'_{11} \quad (3)$$

$$n_1 \cdot \sin\theta_{11} = n_2 \cdot \sin\theta_{21} \quad (4)$$

wherein $n_1$ is the refractive index of air;

$n_2$ is the refractive index of the material of said lens;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta_{21}$ is the angle of incidence when the light from the outermost portion of said extended light source is going to leave said lens through said annular section at the outermost;

$\theta'_{21}$ is the angle of incidence when the light from the outermost portion of said extended light source enters said lens;

h is the thickness of the edge of said annular section at the outermost;

L is the diameter of said extended light source;

D is the diameter of said lens; and

H is the distance between said lens and said extended light source.

13. The method of claim 11, wherein said calculating the width of each of the said annular sections based on said angle of refraction obtained is expressed in the following equation (5) wherein said width of each of the said annular sections is represented by width of annular sections at the outermost:

$$\frac{m_1}{\sin\beta} = \frac{\sqrt{\left(G + \frac{L}{n} + c\right)^2 + h^2}}{\sin(90° + \theta'_{21} - \theta'_{11} - \theta_{21})} \quad (5)$$

wherein $$\beta = 90° - \theta'_{21} - \tan^{-1}\frac{h}{G + \frac{L}{n} + c} \quad (6)$$

$$c = \frac{h \cdot \sin\theta'_{11}}{\sin(90° - \theta'_{11})} \quad (7)$$

$$B = \frac{H}{\sin(90° - \theta'_{21})} \quad (8)$$

$$G = \frac{B \cdot \sin(\theta'_{21} - \theta'_{22})}{\sin(90° + \theta'_{22})} \quad (9)$$

wherein B, G and c are assisted lengths and β is an assisted angle for calculation as shown in FIG. 6;

$m_1$ is the width of said annular section at the outermost;

$\theta_{11}$ is the angle of refraction when the light from the outermost portion of said extended light source leaves said lens through said annular section at the outermost;

$\theta'_{11}$ is the angle of refraction when the light from the outermost portion of said extended light source has entered said lens;

$\theta'_{21}$ is the angle of incidence when the light from the outermost portion of said extended light source enters said lens;

$\theta'_{22}$ is the angle of incidence when the light from the second outermost portion of said extended light source enters said lens;

$$\frac{L}{n}$$

is the size of each portion of said extended light source assuming that said extended light source is divided into n portions;

h is the thickness of the edge of said annular section at the outermost; and

H is the distance between said lens and said extended light source.

\* \* \* \* \*